US008265024B2

(12) United States Patent
Jeon (10) Patent No.: US 8,265,024 B2
(45) Date of Patent: Sep. 11, 2012

(54) FREQUENCY REUSING METHOD IN WIRELESS COMMUNICATION SYSTEM AND RADIO ACCESS STATION SYSTEM FOR THE SAME

(75) Inventor: Hyung-Joon Jeon, Seongnam-si (KR)

(73) Assignee: Seah Networks Co., Ltd., Seoul (KR)

( * ) Notice: Subject to any disclaimer, the term of this patent is extended or adjusted under 35 U.S.C. 154(b) by 379 days.

(21) Appl. No.: 12/439,475

(22) PCT Filed: Aug. 28, 2007

(86) PCT No.: PCT/KR2007/004135
§ 371 (c)(1),
(2), (4) Date: Feb. 27, 2009

(87) PCT Pub. No.: WO2008/026867
PCT Pub. Date: Mar. 6, 2008

(65) Prior Publication Data
US 2010/0014471 A1   Jan. 21, 2010

(30) Foreign Application Priority Data

Sep. 1, 2006 (KR) .................. 10-2006-0084420

(51) Int. Cl.
*H04W 72/04* (2009.01)

(52) U.S. Cl. ........................... 370/329; 455/447

(58) Field of Classification Search .......... 370/329, 370/335, 241, 280, 350, 331; 375/335, 260; 455/63.1, 447, 522, 450, 456.5, 62
See application file for complete search history.

(56) References Cited

U.S. PATENT DOCUMENTS

| | | | |
|---|---|---|---|
| 5,848,357 A * | 12/1998 | Dehner et al. | 455/447 |
| 6,154,654 A * | 11/2000 | Mao | 455/446 |
| 6,188,903 B1* | 2/2001 | Gardner et al. | 455/447 |
| 6,256,486 B1* | 7/2001 | Barany et al. | 455/296 |
| 6,405,048 B1* | 6/2002 | Haartsen | 455/464 |
| 2003/0166404 A1* | 9/2003 | Chuang et al. | 455/453 |
| 2004/0097238 A1 | 5/2004 | Hwang et al. | |
| 2004/0246998 A1* | 12/2004 | Ma et al. | 370/527 |
| 2005/0025039 A1* | 2/2005 | Hwang et al. | 370/206 |
| 2005/0197129 A1* | 9/2005 | Cho et al. | 455/447 |
| 2005/0282550 A1 | 12/2005 | Cho et al. | |
| 2006/0133321 A1* | 6/2006 | Lim et al. | 370/331 |
| 2006/0140217 A1* | 6/2006 | Jung et al. | 370/468 |
| 2006/0189321 A1* | 8/2006 | Oh et al. | 455/452.2 |
| 2007/0147287 A1* | 6/2007 | Jalil et al. | 370/329 |
| 2008/0089278 A1* | 4/2008 | Chang et al. | 370/329 |
| 2009/0061778 A1* | 3/2009 | Vrzic et al. | 455/62 |

OTHER PUBLICATIONS

International Search Report for application No. PCT/KR2007/004135 filed Aug. 28, 2007.

* cited by examiner

*Primary Examiner* — Jean Gelin
*Assistant Examiner* — Mahendra Patel

(57) ABSTRACT

A frequency reusing method in a wireless communication system including a coverage region, which has first, second and third regions, and a radio access station (RAS) transmitting a traffic to a portable subscriber station (PSS) in the coverage region, comprises (a) transmitting the traffics by assigning an identical frequency band to the first, second and third regions during a first interval; (b) transmitting the traffics by assigning the identical frequency band to the first region during a second interval; (c) transmitting the traffics by assigning the identical frequency band to the second region during a third interval; and (d) transmitting the traffics by assigning the identical frequency band to the third region during a fourth interval.

28 Claims, 6 Drawing Sheets

FREQUENCY REUSING METHOD IN WIRELESS COMMUNICATION SYSTEM AND RADIO ACCESS STATION SYSTEM FOR THE SAME

TECHNICAL FIELD

The present invention relates to a wireless communication system, and more particularly, to a frequency reusing method for efficiently transmitting traffics in a radio access station system of an orthogonal frequency division multiple access (OFDMA) type according to at least one of IEEE 802.16d/e, WiBro (Wireless Broadband Internet), and WiMAX standards and a radio access station system for the frequency reusing method.

BACKGROUND ART

Generally, a wireless communication system includes a portable subscriber station (PSS), a radio access station (RAS), a repeater and a contents server. The portable subscriber station (PSS) can use communication services, such as call connection, digital broadcast, digital media downloading, uploading, and so on, via the radio access station (RAS) in a wireless net. The contents server manages users of the portable subscriber station (PSS) and provides necessary contents to the portable subscriber station (PSS). If there is the radio access station (RAS) without the repeater in a region, a signal reception becomes poor in the region. The poor signal reception is compensated with the repeater.

Since there exists a limitation of available frequencies in a wireless communication system, the frequencies are assigned to the radio access stations (RAS) depending on their services. Moreover, the frequencies are used in duplicate by separating the radio access stations (RAS) from each other to avoid interference between adjacent radio access stations (RAS). In this case, a plurality of sectors in a cell of each radio access stations (RAS) may use different frequencies. The plurality of sectors may use frequencies at the same time.

Figure 1:
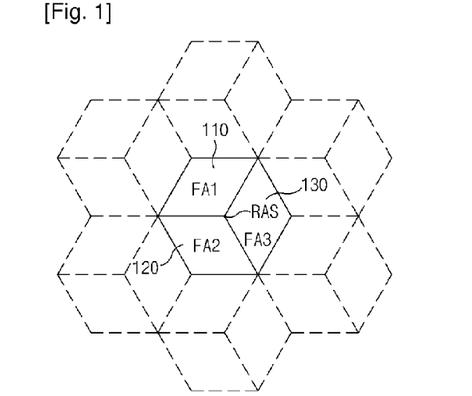
FIG. 1 is a schematic view showing a conventional radio access station (RAS) using different frequencies.

FIG. 1 is a schematic view showing a conventional radio access station (RAS) using different frequencies. In other word, FIG. 1 shows a frequency reuse factor-3 (FRF-3) type scheme. In more detail, in the wireless communication system adopting the frequency reuse factor-3 (FRF-3) type scheme, a region, which one radio access station (RAS) covers, is divided into a plurality of sectors. The region is defined as a cell. Namely, the region is divided into first, second and third sectors 110, 120 and 130, and the first, second and third sectors 110, 120 and 130 constitute the cell. Then, different three frequencies are assigned each sectors, and thereby providing communication services between the radio access station "RAS and the portable subscriber stations (PSS). The radio access station "RAS communicates the portable subscriber stations (PSS) in the first sector 110 using a first frequency "FA1". The radio access station "RAS communicates the portable subscriber stations (PSS) in the second sector 120 using a second frequency "FA2". The radio access station "RAS communicates the portable subscriber stations (PSS) in the third sector 130 using a third frequency "FA3". In this case, each of the first, second and third sectors 110, 120 and 130 transmit the traffics using carrier waves respectively assigned to different frequencies.

In the conventional wireless communication system adopting the frequency reuse factor-3 (FRF-3) type scheme shown in FIG. 1, since each sectors uses different frequencies, there are few interference in border region between adjacent sectors and between adjacent cells of adjacent radio access stations "RAS". Accordingly, there is no problem of decrease of a carrier to interference and noise ratio (CINR), and cell coverage increases. However, because each sector uses one frequency, there is a relatively low system capacity.

Figure 2:
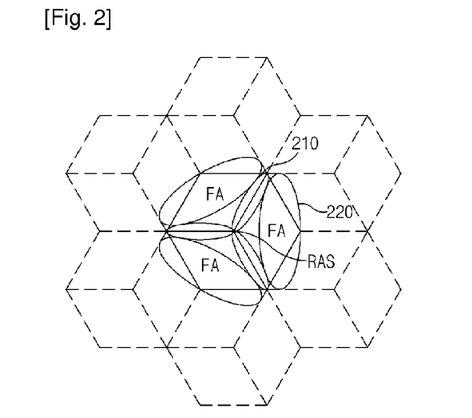
FIG. 2 is a schematic view showing a conventional radio access station (RAS) using an identical frequency.
Figure 3:
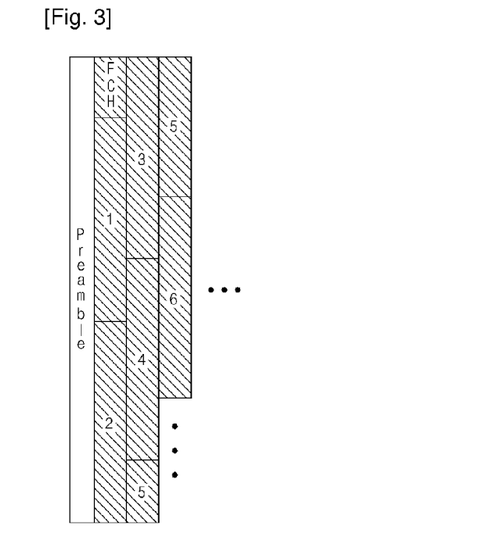
FIG. 3 is a schematic view showing a data frame sending and receiving between a radio access station (RAS) and a portable subscriber stations (PSS) in FIG. 2.

FIG. 2 is a schematic view showing a conventional radio access station (RAS) using an identical frequency. In other word, FIG. 2 shows a frequency reuse factor-1 (FRF-1) type scheme. In the wireless communication system adopting the frequency reuse factor-1 (FRF-1) type scheme, all sectors in each radio access station "RAS uses an identical frequency "FA to transmit the traffics. Accordingly, the system capacity is improved. Namely, as shown in FIG. 3, for example, in a quadrature phase shift keying (QPSK) $\frac{1}{12}$ modulation type, one control message following a preamble and a frame control header "FCH in a data frame is transmitted repeatedly. The one control message may be transmitted six times.

However, in the wireless communication system adopting the frequency reuse factor-1 (FRF-1) type scheme in FIG. 2, signal interference at a border region 210 between adjacent sectors and a border region 220 between adjacent cells of adjacent radio access stations "RAS is easily caused. Namely, since every sector and every cell uses identical frequency band to provide communication services in the wireless communication system adopting the frequency reuse factor-1 (FRF-1) type scheme, signal interference at the border region 210 between the adjacent sectors and the border region 220 between the adjacent cells of the adjacent radio access stations "RAS is easily caused. As a result, a carrier to interference and noise ratio (CINR) of the portable subscriber station (PSS) decreases, and it is difficult to provide communication services. Communication service quality is deteriorated.

DISCLOSURE OF INVENTION

Technical Problem

As mentioned above, in the conventional wireless communication system adopting the frequency reuse factor-3 (FRF-3) type scheme shown in FIG. 1, which may be a relatively high frequency reuse factor (FRF), since each sectors uses different frequencies, there are few interference in border region between adjacent sectors and between adjacent cells of adjacent radio access stations (RAS). However, because each sector uses one frequency band, there is a relatively low system capacity.

In the wireless communication system adopting the frequency reuse factor-1 (FRF-1) type scheme, which may be a relatively low frequency reuse factor (FRF), the system capacity is improved. However, a carrier to interference and noise ratio (CINR) of the portable subscriber station (PSS) decreases, and it is difficult to provide communication services. Moreover, communication service quality is deteriorated.

To solve the above problems, the present invention provides a method of frequency reuse in a wireless communication system where each sector or each cell in a radio access station (RAS) time-divisionally uses total frequency band in a frequency reuse factor-1 (FRF-1) type scheme depending on magnitude of communicated signal between the radio access station (RAS) and a portable subscriber station (PSS), and an apparatus for the method.

Technical Solution

Accordingly, embodiments of the invention is directed to a frequency reuse method and a radio access station system for the frequency reuse that substantially obviate one or more of the problems due to limitations and disadvantages of the related art are described.

An object of the embodiments of the invention is to provide a frequency reusing method and a radio access station (RAS) system having advantages of both a relatively low frequency reuse factor (FRF) type scheme and a relatively high frequency reuse factor (FRF) type scheme except disadvantages of them by time-divisionally reusing a total frequency band in each sector or each cell depending on magnitude of communication signal between a radio access station (RAS) and a portable subscriber station (PSS).

Another object of the embodiments of the invention is to provide a frequency reusing method and a radio access station (RAS) system where a frequency reuse plan is flexibly adopted considering signal interference between adjacent sectors and between adjacent cells such that cell coverage and system capacity are improved.

Another object of the embodiments of the invention is to provide a frequency reusing method and a radio access station (RAS) system where each interval is set for less than 5 msec and a total interval of the first to fourth intervals is set for less than 20 msec in the radio access station such that user of the portable subscriber station (PSS) does not feel disconnection of communication between the portable subscriber station (PSS) and the radio access station (RAS).

Another object of the embodiments of the invention is to provide a frequency reusing method and a radio access station (RAS) system where a sleep mode is further adopted such that efficiency of the portable subscriber station (PSS) is improved.

To achieve these and other advantages and in accordance with the purpose of embodiments of the invention, as embodied and broadly described, a frequency reusing method in a wireless communication system including a coverage region, which has first, second and third regions, and a radio access station (RAS) transmitting a traffic to a portable subscriber station (PSS) in the coverage region, comprises (a) transmitting the traffics by assigning an identical frequency band to the first, second and third regions during a first interval; (b) transmitting the traffics by assigning the identical frequency band to the first region during a second interval; (c) transmitting the traffics by assigning the identical frequency band to the second region during a third interval; and (d) transmitting the traffics by assigning the identical frequency band to the third region during a fourth interval.

In another aspect, a frequency reusing method in a wireless communication system including a plurality of coverage regions, wherein a radio access station (RAS) transmitting a traffic to a portable subscriber station (PSS) in the plurality of coverage regions, comprises (a) transmitting the traffic by assigning the identical frequency band to all of the plurality of coverage regions during a first interval; and (b) transmitting the traffic at least once by assigning the identical frequency band to a first coverage region during a second interval, wherein the identical frequency band is reused in the plurality of coverage regions.

In another aspect, a radio access station (RAS) system for a frequency reuse comprises a carrier to interference and noise ratio (CINR) measuring unit measuring a carrier to interference and noise ratio (CINR) of a plurality of portable subscriber stations; a frequency reuse (FR) determining unit determining a frequency reuse plan by comparing the carrier to interference and noise ratio and a threshold value; and a scheduler performing a first traffic transmission by assigning an identical frequency band to all coverage regions during a first interval and a second traffic transmission by assigning the identical frequency band to at least one of the plurality of coverage regions during a second interval depending on the frequency reuse plan, wherein the identical frequency band is reused by the plurality of coverage regions.

Advantageous Effects

In a method of frequency reuse in a wireless communication system and an apparatus for the same according to the present invention, each sector or each cell in a radio access station (RAS) time-divisionally uses total frequency band in a frequency reuse factor-1 (FRF-1) type scheme depending on magnitude of communicated signal between the radio access station (RAS) and a portable subscriber station (PSS) to have advantages of both a relatively high frequency reuse factor (FRF), e.g., a frequency reuse factor-3 (FRF-3) type scheme, and a relatively low frequency reuse factor (FRF), e.g., a frequency reuse factor-1 (FRF-1) type scheme.

Moreover, a frequency reuse plan is adopted flexibly considering signal interference between adjacent sectors and between adjacent cells such that cell coverage and system capacity are improved.

In the present invention, a similar scheme to a frequency reuse factor-1 (FRF-1) is adopted. However, since a data frame including a single control message when communication services are provided in the single coverage region, an over-header problem with respect to generating the data frame is reduced.

Moreover, since a sleep mode is adopted to portable subscriber stations (PSS) having relatively low signal interference, power consumption of the radio access station (RAS) system and the portable subscriber stations (PSS) is reduced.

Furthermore, a method of frequency reuse in a wireless communication system and an apparatus for the same according to the present invention are available not only in a single radio access station (RAS) having a plurality of sectors but also in multiple radio access stations (RAS) using an omnidirectional antenna.

In addition, a method of frequency reuse in a wireless communication system and an apparatus for the same according to the present invention provide excellent communication services to a radio access station (RAS) for portable internet services according to at least one of IEEE 802.16d/e, WiBro and WiMAX standards.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

BEST MODE FOR CARRYING OUT THE INVENTION

Reference will now be made in detail to the preferred embodiments of the invention, examples of which are illustrated in the accompanying drawings.

A radio access station (RAS) system according to an embodiment of the present invention assigns at least one total frequency band and transmits traffics to a plurality of coverage regions. The radio access station (RAS) system communicates with the coverage regions through at least one of an antenna in a plurality of sectors and an omnidirectional antenna of the radio access station (RAS). Accordingly, a frequency reuse factor-1 (FRF-1) type scheme is time-divisionally adopted. In this case, an orthogonal frequency division multiple access (OFDMA) scheme according to at least one of IEEE 802.16d/e, WiBro and WiMAX standards is adopted to the radio access station (RAS).

In FIGS. 4 to 9, one radio access station (RAS) includes a plurality of coverage regions, e.g., three sectors. A total frequency band "FA1+FA2+FA3 including a plurality of frequencies, which are represented "FA1", "FA2", "FA3", etc, is assigned to all sectors, and then traffics are transmitted. And then, the total frequency band "FA1+FA2+FA3" are sequentially assigned to the sectors to transmit the traffics. However, as described below, in a method of a frequency reuse according to an embodiment of the present invention, various modifications and variations to a transmission number of the traffics by assigning the total frequency band to all of the coverage regions and a transmission number of the traffics by sequentially assigning the total frequency band to each coverage regions will be apparent to those skilled in the art.

Figure 4:
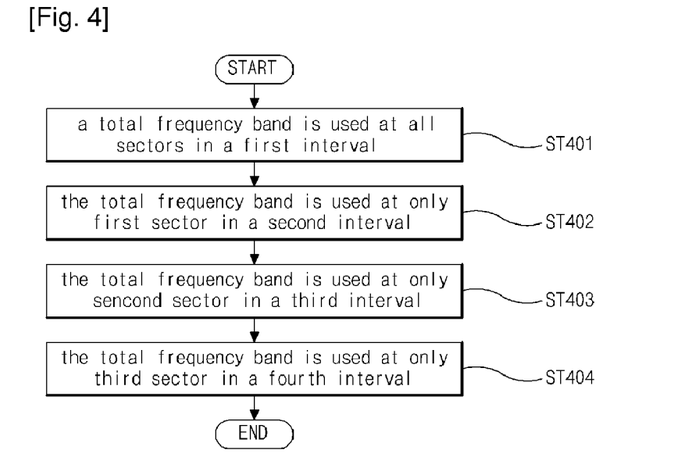
FIG. 4 is a flow chart to explain a method of a frequency reuse in wireless communication system according to an embodiment of the present invention.

FIG. 4 is a flow chart to explain a method of a frequency reuse in wireless communication system according to an embodiment of the present invention. The method of the frequency reuse of FIG. 4 is explained with FIGS. 5 to 9.

Figure 5:
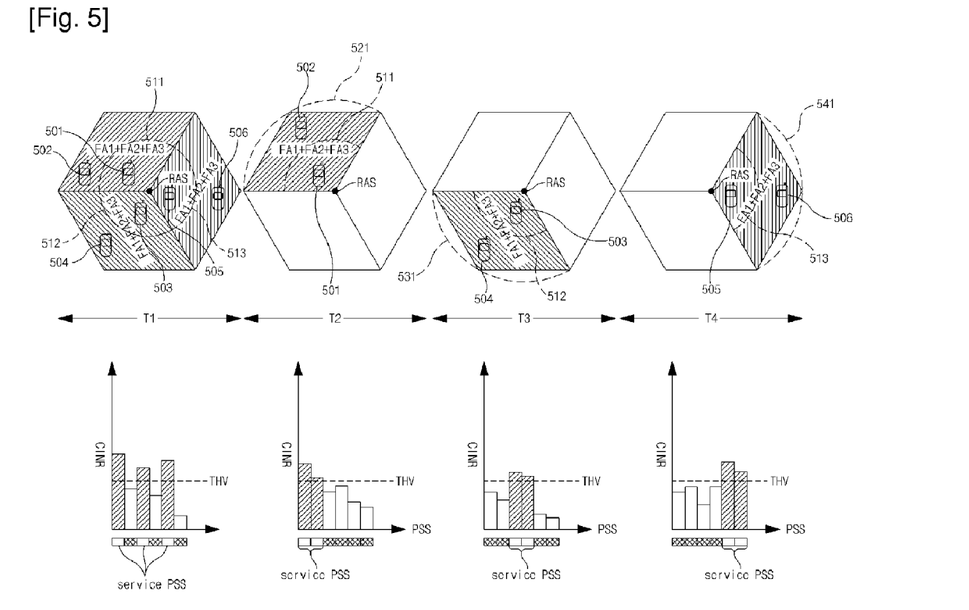
FIG. 5 is a schematic view to explain a data frame sending and receiving per period according to a method of a frequency reuse in FIG. 4.

A radio access station "RAS in the present invention includes first, second and third sectors 521, 531 and 541 and uses three frequencies "FA1", "FA2" and "FA3". The first to third sectors 521, 531 and 541 constitute a coverage region of the radio access station "RAS" and the frequencies "FA1", "FA2" and "FA3" constitute a total frequency band "FA1+FA2+FA3". In the present invention, traffics are transmitted by time-divisionally assigning one total frequency band "FA1+FA2+FA3 to all sectors or each sector. As a result, compared to the conventional radio access station (RAS) where the conventional frequency reuse factor-1 (FRF-1) type scheme is adopted, coverage regions where communication services are available with the radio access station (RAS) increase. Moreover, since the total frequency band "FA1+FA2+FA3" includes a plurality of frequencies "FA1", "FA2" and "FA3", system capacity is improved. Furthermore, since the total frequency band "FA1+FA2+FA3" are assigned to a single sector during an interval and the data frame including the repeatedly transmitted control message is not used unlike the conventional frequency reuse factor-1 (FRF-1) type scheme, an over-header problem for the system is prevented.

In FIGS. 4 and 5, the radio access station "RAS assigns the total frequency band "FA1+FA2+FA3 to all three sectors 521, 531 and 541 to transmit the traffics during a first interval "T1". (ST 401) This is similar to the conventional frequency reuse factor-1 (FRF-1) type scheme. Next, the radio access station "RAS assigns the total frequency band "FA1+FA2+FA3 to the first sector 521 except the second and third sectors 531 and 541 to transmit the traffics during a second interval T2". (ST 402) Next, the radio access station "RAS assigns the total frequency band "FA1+FA2+FA3 to the second sector 531 except the first and third sectors 521 and 541 to transmit the traffics during a third interval "T3". (ST 403) Next, the radio access station "RAS assigns the total frequency band "FA1+FA2+FA3 to the third sector 541 except the first and second sectors 521 and 531 to transmit the traffics during a fourth interval "T4". (ST 404)

In FIG. 5, reference numbers 511, 512 and 513 respectively represent regions, where signal interference is relatively low, of each sector during the first interval T1. As mentioned above, the radio access station "RAS includes a coverage region having first to third sectors 521, 531 and 541. Two portable subscriber stations (PSS) exist in each of the sectors 521, 531 and 541. First and second portable subscriber stations (PSS) 501 and 502 exist in the first sector 521, the third and fourth portable subscriber stations (PSS) 503 and 504 exist in the second sector 531, and the fifth and sixth portable subscriber stations (PSS) 505 and 506 exist in the third sector 541. In this case, it is assumed that a carrier to interference and noise ratio "CINR of the first, third and fifth portable subscriber stations (PSS) 501, 503 and 505 at interior of the regions 511, 512 and 513 is greater than a threshold value "THV". Moreover, it is assumed that a carrier to interference and noise ratio "CINR of the second, fourth and sixth portable subscriber stations (PSS) 502, 504, 506 at exterior of the regions 511, 512 and 513 is less than the threshold value "THV". Furthermore, since a border region of the coverage region has a signal interference problem due to adjacent coverage regions, portable subscriber stations (PSS) in the border region may be treated as the portable subscriber stations (PSS) 502, 504, 506.

The radio access station "RAS may periodically receive data of the carrier to interference and noise ratio "CINR from each portable subscriber station (PSS) during a period of down-link. The carrier to interference and noise ratio "CINR may be calculated by detecting magnitude of signals sent by each portable subscriber station (PSS) during a period of up-link. When a carrier to interference and noise ratio "CINR is greater than reference value, satisfactory communication between the radio access station (RAS) and the portable subscriber station (PSS) may be secured.

Particularly, since the first, third and fifth portable subscriber stations (PSS) 501, 503 and 505 are relatively close to the radio access station "RAS", they feel a relatively low amount of signal interference and have the carrier to interference and noise ratio "CINR greater than threshold value "THV". Accordingly, they receive the traffics with the total frequency band "FA1+FA2+FA3 during the first interval "T1". Namely, in the first, third and fifth portable subscriber stations (PSS) 501, 503 and 505, signal interference is reduced and excellent communication services with the radio access station "RAS" is secured.

On the other hand, since the second, fourth and sixth portable subscriber stations (PSS) 502, 504 and 506 are relatively far to the radio access station "RAS", they feel a relatively greater amount signal interference and have the carrier to interference and noise ratio "CINR less than the threshold value "THV". They receive the traffics with the total frequency band "FA1+FA2+FA3 during one of the second to fourth intervals "T2", "T3 and "T4". In this case, the second, fourth and sixth portable subscriber stations (PSS) 502, 504 and 506 can receive communication services with a relatively low amount of signal interference. Namely, the second, fourth and sixth portable subscriber stations (PSS) 502, 504 and 506 closer to adjacent coverage cell or adjacent sector than the radio access station "RAS communicate the radio access station "RAS with traffics during one of the second to fourth intervals "T2", "T3 and "T4 and receive excellent communication services with a relatively low amount of signal interference.

Returning FIG. 5, reference numbers 551, 561, 571 and 581 respectively represent graphs showing the carrier to interference and noise ratio "CINR of the portable subscriber stations (PSS) during the first to fourth intervals "T1", "T2", "T3 and "T4 and the threshold value "THV". In a first graph 551, three portable subscriber stations (PSS) having the carrier to interference and noise ratio "CINR greater than the threshold value "THV are defined as service portable subscriber stations. The service portable subscriber stations may be the first, third and fifth portable subscriber stations (PSS) 501, 503 and 505. Namely, during the first interval "T1", the first, third and fifth portable subscriber stations (PSS) 501, 503 and 505 satisfactorily communicate with the radio access station "RAS".

On the other hand, in a second graph 561, two portable subscriber stations (PSS) having the carrier to interference and noise ratio "CINR greater than the threshold value "THV are defined as service portable subscriber stations. The service portable subscriber stations may be the first and second portable subscriber stations (PSS) 501 and 502 in the first sector 521. Namely, during the second interval "T2", the first and second portable subscriber stations (PSS) 501 and 502 satisfactorily communicate with the radio access station "RAS".

Similarly, in a third graph 571, the third and fourth portable subscriber stations (PSS) 503 and 504 in the second sector 531 satisfactorily communicate with the radio access station "RAS during the third interval "T3". In a fourth graph 581, the fifth and sixth portable subscriber stations (PSS) 505 and 506 in the third sector 541 satisfactorily communicate with the radio access station "RAS during the fourth interval "T4". Although there are portable subscriber stations (PSS) having a carrier to interference and noise ratio "CINR less than a threshold value "THV", the radio access station "RAS provides excellent communication services to portable subscriber stations (PSS) with a relatively low signal interference during intervals except the first interval "T1".

As mentioned above, since the radio access station "RAS according to the present invention uses multiple frequency bands similar to the conventional frequency reuse factor-1 (FRF-1) type scheme, system capacity of the radio access station "RAS according to the present invention increases. Moreover, since there is little signal interference in the radio access station "RAS system according to the present invention similar to the conventional frequency reuse factor-3 (FRF-3) type scheme, coverage regions are maximized. Furthermore, since the radio access station "RAS provides communication services to portable subscriber stations (PSS) in one sector during intervals except the first interval T1, an over-header problem of the system is prevented.

There are portable subscriber stations (PSS), which are disconnected with the radio access station "RAS", during second to fourth intervals "T2", "T3" and "T4". For example, during the second interval "T2", the third to sixth portable subscriber stations (PSS) 503, 504, 505 and 506 in the second and third sectors 531 and 541 are disconnected with the radio access station "RAS". However, by setting each interval less than 5 msec and a total interval of the first to fourth intervals "T1", "T2", "T3 and "T4 less than 20 msec, it is possible to remove a disconnection problem between each of the portable subscriber stations (PSS) 501, 502, 503, 504, 505 and 506 and the radio access station "RAS through the second to fourth intervals "T2", "T3 and "T4".

FIGS. 6 to 9 respectively show a data frame sending and receiving between the radio access station (RAS) and the portable subscriber station (PSS) during first to fourth intervals.

Figure 6:
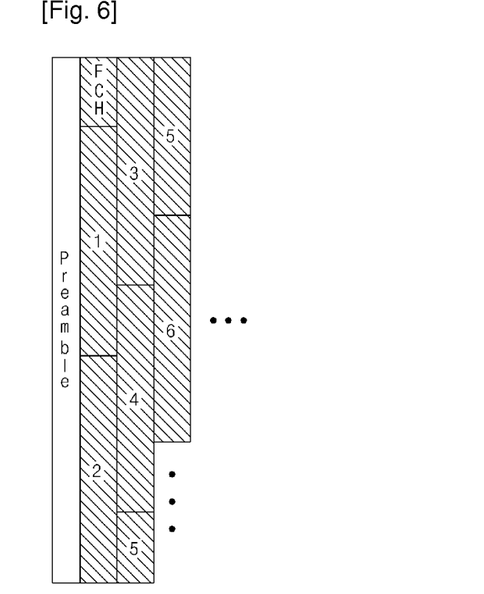
FIG. 6 is a schematic view to explain a data frame sending and receiving during an interval of T1 of FIG. 5.

As shown in FIG. 6, the radio access station "RAS (of FIG. 5) sends a data frame to each portable subscriber station (PSS) using available total frequency band "FA1+FA2+FA3 (of FIG. 5) during the first interval "T1 (of FIG. 5) such that the radio access station "RAS (of FIG. 5) communicates the first, third and fifth portable subscriber stations (PSS) 501, 503 and 505 (of FIG. 5) having a carrier to interference and noise ratio "CINR (of FIG. 5) greater than the threshold value "THV (of FIG. 5). The data frame follows a preamble and includes a frame control header "FCH", a control message for mapping a data region, and a body. The control messages may be repeatedly sent to increase a receipt ratio of the traffics. For example, the control message is sent six times.

Figure 7:
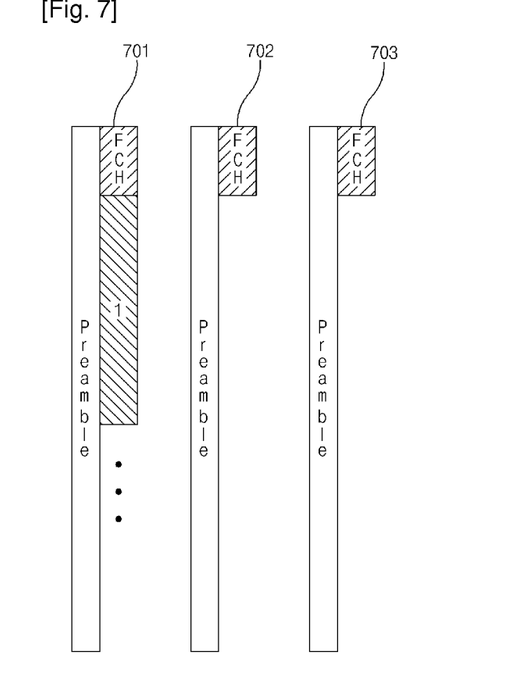
FIG. 7 is a schematic view to explain a data frame sending and receiving during an interval of T2 of FIG. 5.

As shown in FIG. 7, a data frame 701 including a single control message 1 is sent to the portable subscriber stations (PSS) 501 and 502 (of FIG. 5) at the first sector 521 (of FIG. 5) during the second interval "T2 (of FIG. 5) using available total frequency band "FA1+FA2+FA3 (of FIG. 5). As a result, the second portable subscriber station (PSS) 502 (of FIG. 5), which have a carrier to interference and noise ratio "CINR (of FIG. 5) less than the threshold value "THV (of FIG. 5) during the first interval "T1 (of FIG. 5), in the first sector 521 (of FIG. 5) has a carrier to interference and noise ratio "CINR (of FIG. 5) greater than the threshold value "THV (of FIG. 5) during the second interval "T2 (of FIG. 5) such that the second portable subscriber station (PSS) 502 (of FIG. 5) can communicate with the radio access station "RAS (of FIG. 5) during the second interval "T2 (of FIG. 5). Of course, the first portable subscriber station (PSS) 501 (of FIG. 1) has a carrier to interference and noise ratio "CINR (of FIG. 5) greater than the threshold value "THV (of FIG. 5) during the second interval "T2 (of FIG. 5) such that the first portable subscriber station (PSS) 501 (of FIG. 5) can communicate with the radio access station "RAS (of FIG. 5) during the second interval "T2 (of FIG. 5). Moreover, since the data frame 701 includes a single control message 1 without repeated control messages, an over-header problem with respect to generating the data frame is reduced. At the same time, vacant data frames 702 and 703 including no control message are sent to the second and third sectors 531 and 541 (of FIG. 5), respectively. However, the vacant data frames 702 and 703 may not be sent. Although the portable subscriber stations (PSS) in the second and third sectors 531 and 541 (of FIG. 5) do not receive any data frame during the second interval "T2 (of FIG. 5), they can communicate with the radio access station "RAS (of FIG. 5) without disconnection. It is because user only feels disconnection when the disconnection keeps an interval greater than 20 msec. As mentioned above, since each interval is set for less than 5 msec and a total interval of the first to fourth intervals is set for less than 20 msec in the radio access station "RAS (of FIG. 5) system according to the present invention, the radio access station "RAS (of FIG. 5) sends a data frame at least once to each portable subscriber station (PSS) such that user does not feel disconnection.

Figure 8:
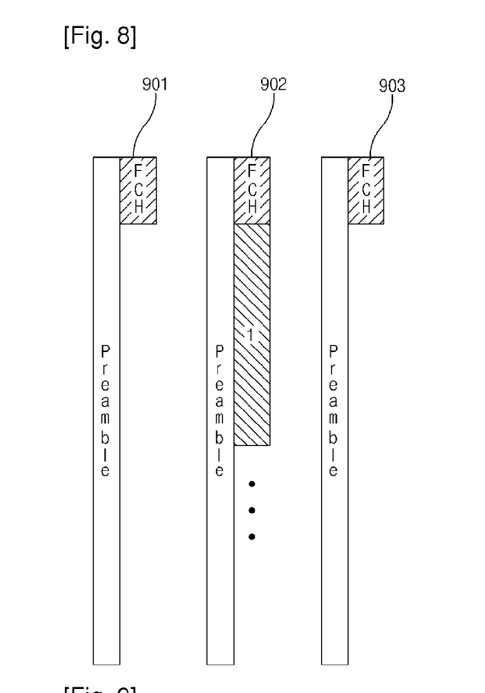
FIG. 8 is a schematic view to explain a data frame sending and receiving during an interval of T3 of FIG. 5.

As shown in FIG. 8, a data frame 802 including a single control message 1 is sent to the portable subscriber stations (PSS) 503 and 504 (of FIG. 5) at the second sector 531 (of FIG. 5) during the third interval "T3 (of FIG. 5) using available total frequency band "FA1+FA2+FA3 (of FIG. 5). As a result, the fourth portable subscriber station (PSS) 504 (of FIG. 5), which have a carrier to interference and noise ratio "CINR (of FIG. 5) less than the threshold value "THV (of FIG. 5) during the first and second intervals "T1 and "T2 (of FIG. 5), in the second sector 531 (of FIG. 5) has a carrier to interference and noise ratio "CINR (of FIG. 5) greater than the threshold value "THV (of FIG. 5) during the third interval "T3 (of FIG. 5). Accordingly, not only the third portable subscriber station (PSS) 503 (of FIG. 5) but also the fourth portable subscriber station (PSS) 504 (of FIG. 5) can communicate with the radio access station "RAS (of FIG. 5) during the third interval "T3 (of FIG. 5). Since the data frame 802 has a single control message 1 without repeated control messages, an over-header problem with respect to generating the data frame is reduced. Similar to FIG. 7, vacant data frames 801 and 803 may be respectively sent to the first and third sectors 521 and 541 (of FIG. 5).

Figure 9:
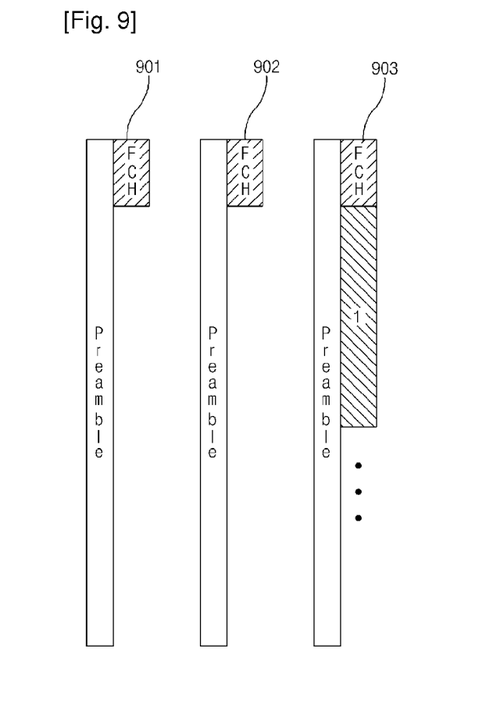
FIG. 9 is a schematic view to explain a data frame sending and receiving during an interval of T4 of FIG. 5.

As shown in FIG. 9, a data frame 903 including a single control message 1 is sent to the portable subscriber stations (PSS) 505 and 506 (of FIG. 5) at the third sector 541 (of FIG. 5) during the fourth interval "T4 (of FIG. 5) using available total frequency band "FA1+FA2+FA3 (of FIG. 5). As a result, the sixth portable subscriber station (PSS) 506 (of FIG. 5), which have a carrier to interference and noise ratio CINR (of FIG. 5) less than the threshold value "THV (of FIG. 5) during the first, second and third intervals "T1", "T2 and "T3 (of FIG. 5), in the third sector 541 (of FIG. 5) has a carrier to interference and noise ratio "CINR (of FIG. 5) greater than the threshold value "THV (of FIG. 5) during the fourth interval "T4 (of FIG. 5). Accordingly, not only the fifth portable subscriber station (PSS) 505 (of FIG. 5) but also the sixth portable subscriber station (PSS) 506 (of FIG. 5) can communicate with the radio access station "RAS (of FIG. 5) during the fourth interval "T4 (of FIG. 5). Since the data frame 903 has a single control message 1 without repeated control messages, an over-header problem with respect to generating the data frame is reduced. Similar to FIGS. 7 and 8, vacant data frames 901 and 902 may be respectively sent to the first and second sectors 521 and 531 (of FIG. 5).

Consequently, since the radio access station (RAS) according to the present invention uses multiple frequency bands similar to the conventional frequency reuse factor-1 (FRF-1) type scheme, system capacity of the radio access station (RAS) according to the present invention increases. Moreover, since there is little signal interference in the radio access station (RAS) system according to the present invention similar to the conventional frequency reuse factor-3 (FRF-3) type scheme, coverage regions are maximized. Furthermore, since the radio access station (RAS) provides communication services to portable subscriber stations (PSS) in one sector during intervals except the first interval T1, an over-header problem of the system is prevented.

MODE FOR THE INVENTION

Figure 10:
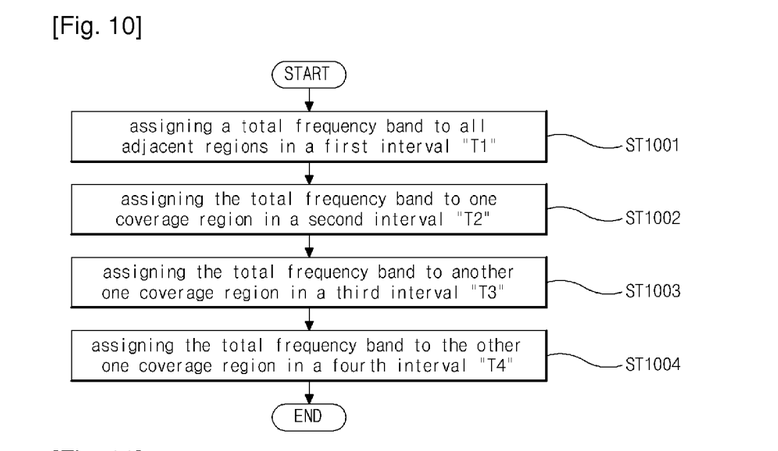
FIG. 10 is a flow chart to explain a method of a frequency reuse in wireless communication system according to an embodiment of the present invention.
Figure 11:
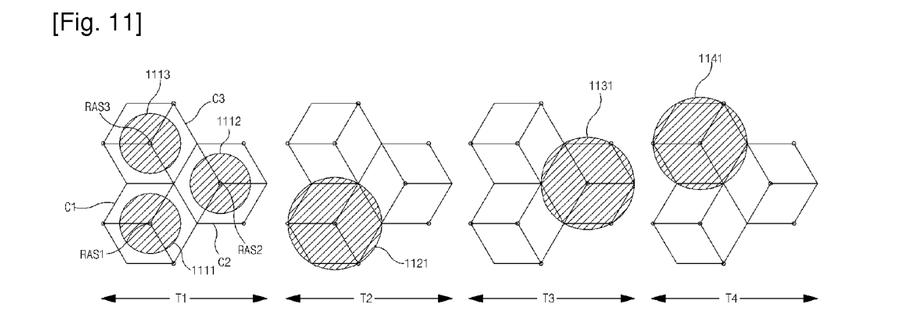
FIG. 11 is a schematic view to explain a data frame sending and receiving per period according to a method of a frequency reuse in FIG. 4.

FIG. 10 is a flow chart to explain a method of a frequency reuse in wireless communication system according to an embodiment of the present invention. In this embodiment, each of adjacent three radio access stations (RAS) covers a single cell. In FIG. 11, a first radio access station "RAS1 covers a first cell "C1", a second radio access station "RAS2" covers a second cell "C2", and a third radio access station "RAS3 covers a third cell "C3". The radio access stations (RAS) may use one of an omnidirectional antenna and a plurality of sector antennas to communicate portable subscriber stations (PSS) in each cell.

As shown in FIGS. 10 and 11, all of the first to third radio access stations "RAS1", "RAS2 and "RAS3 use a total frequency band "FA1+FA2+FA3 to transmit the traffics during a first interval "F1". (ST 1001) During the first interval "T1", portable subscriber stations (PSS) in first to third adjacent regions 1111, 1112 and 1113 have a carrier to interference and noise ratio (CINR) greater than a threshold value (THV). Accordingly, the first, second and third radio access stations "RAS1", "RAS2 and "RAS3 respectively transmit traffics to the portable subscriber stations (PSS) in the first to third adjacent regions 1111, 1112 and 1113. The first, second and third adjacent regions 1111, 1112 and 1113 are defined as regions adjacent to the first, second and third radio access stations "RAS1", "RAS2 and "RAS3". Namely, the first, second and third adjacent regions 1111, 1112 and 1113 are respectively disposed within the first, second and third cells "C1", "C2 and "C3".

Next, the first radio access station "RAS1 except the second and third radio access stations "RAS2 and "RAS3 uses the total frequency band "FA1+FA2+FA3 to transmit the traffics during a second interval "T2". (ST 1002) Accordingly, during the second interval "T2", portable subscriber stations (PSS) in a first coverage region 1121 have a carrier to interference and noise ratio (CINR) greater than the threshold value (THV) such that they can communicate with the first radio access station "RAS I". The first coverage region 1121 substantially corresponds to the first cell "C1". Accordingly, the first radio access station "RAS1 transmits the traffics to the portable subscriber stations (PSS) in the first coverage region 1121. Although portable subscriber stations (PSS) of inner area of the first coverage region 1121 and outer area of the first adjacent region 1111 do not communicate with the first radio access station "RAS1 during the first interval "T1 because of a lower carrier to interference and noise ratio (CINR) than the threshold value (THV) during the first interval "T1", they can communicate with the first radio access station "RAS1 during the second interval "T2". Of course, portable subscriber stations (PSS) of inner area of the first adjacent region 1111 may communicate with the first radio access station "RAS1" during the second interval "T2".

Next, similar to the second interval "T2", the second radio access station "RAS2 except the first and third radio access stations "RAS1 and "RAS3 uses the total frequency band "FA1+FA2+FA3 to transmit the traffics during a third interval "T3". (ST 1003) Accordingly, during the third interval "T3", portable subscriber stations (PSS) in a second coverage region 1131 have a carrier to interference and noise ratio (CINR) greater than the threshold value (THV) such that they can communicate with the second radio access station "RAS2". The second coverage region 1131 substantially corresponds to the second cell "C2". Accordingly, the second radio access station "RAS2 transmits the traffics to the portable subscriber stations (PSS) in the second coverage region 1131. Although portable subscriber stations (PSS) of inner area of the second coverage region 1131 and outer area of the second adjacent region 1112 do not communicate with the second radio access station "RAS2" during the first and second intervals "T1 and "T2" because of their lower carrier to interference and noise ratio (CINR) less than the threshold value (THV), they can communicate with the second radio access station "RAS2" during the third interval "T3".

Similar to the second and third intervals "T2 and "T3", the third radio access station "RAS3 except the first and second radio access stations "RAS1 and "RAS2 uses the total frequency band "FA1+FA2+FA3 to transmit the traffics during a fourth interval "T4". (ST 1004) Accordingly, not only portable subscriber stations (PSS) of inner area of the third adjacent region 1113 but also portable subscriber stations (PSS) of a border region between the third adjacent region 1113 and a third coverage region 1141 can communicate with the third radio access station "RAS3 during the fourth interval "T4".

As mentioned above, since there is little signal interference in portable subscriber stations (PSS) in the first, second and third adjacent regions 1111, 1112 and 1113, the first, second and third radio access stations "RAS1", "RAS2 and "RAS3 use identical frequency band "FA1+FA2+FA3 to communicate the portable subscriber stations (PSS) in the first, second and third adjacent regions 1111, 1112 and 1113 during the first interval "T1". In addition, since there are relatively high possibility on signal interference in portable subscriber stations (PSS) in the border region between each of the adjacent regions 1111, 1112 and 1113 and each of the coverage regions 1121, 1131 and 1141, the first, second and third radio access stations "RAS1", "RAS2 and "RAS3 use identical frequency band "FA1+FA2+FA3 to communicate the portable subscriber stations (PSS) in the border region between each of the adjacent regions 1111, 1112 and 1113 and each of the coverage regions 1121, 1131 and 1141 during the second, third and fourth intervals "T2", "T3" and "T4", respectively.

Since each interval is set less than 5 msec and a total interval of the first to fourth intervals "T1", "T2", "T3 and "T4 is set less than 20 msec, users of portable subscriber stations (PSS) in all regions do not feel disconnection of communication services.

To increase a receipt ratio of the traffics, a control message is repeatedly transmitted in a data frame during the first interval "T1". For example, the control message may be repeated six times. However, each data frame in the second, third and fourth intervals includes a single control message such that an over-header problem with respect to generating the data frame is reduced.

The data frames used this embodiment in the first, second, third and fourth intervals "T1", "T2", "T3 and "T4 are similar to the data frames in FIGS. 6 to 9.

Returning FIG. 11, portable subscriber stations (PSS) in the first, second and third adjacent regions 1111, 1112 and 1113 have a relatively low signal interference between cells during the first interval "T1". Namely, the portable subscriber stations (PSS) in the first, second and third adjacent regions 1111, 1112 and 1113 may have a carrier to interference and noise ratio (CINR) greater than the threshold value (THV) during the first interval "T1". Moreover, the portable subscriber stations (PSS) out of the first, second and third adjacent regions 1111, 1112 and 1113 may have a carrier to interference and noise ratio (CINR) less than the threshold value (THV) during the first interval "T1".

Accordingly, the portable subscriber stations (PSS) having a carrier to interference and noise ratio (CINR) greater than the threshold value (THV) during the first interval "T1 communicate with the first, second and third radio access stations "RAS1", "RAS2 and "RAS3 during the first interval "T1 using the total frequency band with a relatively low signal interference, respectively. On the other hand, the portable subscriber stations (PSS) out of the first, second and third adjacent regions 1111, 1112 and 1113 communicate with the first, second and third radio access stations "RAS1", "RAS2 and "RAS3 during the first, second and third intervals "T1", "T2 and "T3" with a relatively low signal interference, respectively.

Figure 12:
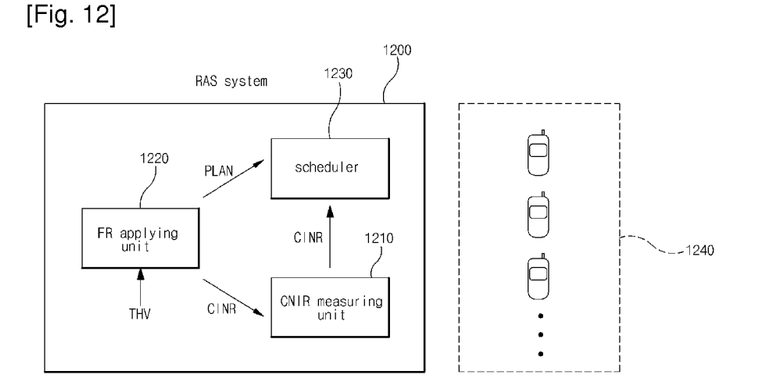
FIG. 12 is a block diagram to explain a radio access station (RAS) system according to an embodiment of the present invention.

FIG. 12 is a block diagram to explain a radio access station (RAS) system according to an embodiment of the present invention. Referring FIG. 12, a radio access station (RAS) system 1200 according to the present invention includes a carrier to interference and noise ratio (CINR) measuring unit 1210, a frequency reuse (FR) determining unit 1220 and a scheduler 1230. The radio access station (RAS) system 1200 may be applied to a portable internet system and a wireless communication system where an orthogonal frequency division multiple access (OFDMA) type scheme according to at least one of IEEE 802.16d/e, WiBro and WiMAX standards. The carrier to interference and noise ratio (CINR) measuring unit 1210 measures a carrier to interference and noise ratio (CINR) from communication signals with portable subscriber stations (PSS) 1240. The carrier to interference and noise ratio (CINR) may be measured by detecting magnitude of signals sent by each portable subscriber station (PSS) 1240 during a period of up-link. On the other hand, the carrier to interference and noise ratio (CINR) measuring unit 1210 may periodically receive data of the carrier to interference and noise ratio (CINR) from each portable subscriber station (PSS) 1240 on a period of down-link. The carrier to interference and noise ratio (CINR) measuring unit 1210 sends the carrier to interference and noise ratio "CINR to the frequency determining unit 1220 and the scheduler 1230. The frequency reuse (FR) determining unit 1220 compares the carrier to interference and noise ratio CINR and a threshold value "THV to determine a frequency reuse plan "PLAN". The frequency reuse determining unit 1220 sends the frequency reuse plan "PLAN to the scheduler 1230. The scheduler 1230 assigns a total frequency band to single or multiple coverage regions considering the carrier to interference and noise ratio "CINR and the frequency reuse plan "PLAN. The coverage region is one of each sector of a single radio access station (RAS) of FIG. 5 and each cell of multiple radio access stations (RAS) of FIG. 11.

As mentioned above, the frequency reuse determining unit 1220 determines the frequency reuse plan "PLAN with the carrier to interference and noise ratio "CINR and the threshold value "THV". When the frequency reuse plan "PLAN is determined, the scheduler 1230 designs to assign a total frequency and transmit N times the traffics to all coverage regions and M times to one of all coverage regions according to the carrier to interference and noise ratio "CINR". N and M are positive integers. A ratio of N to M may be determined depending on magnitude of the carrier to interference and noise ratio "CINR". For example, the ratio of N to M may be one of 1:1, 1:2, 1:3, 2:1, 2:2, 2:3, and so on. After the traffics are transmitted to one coverage region, the traffics are sequentially transmitted to other coverage regions. Namely, regardless of the ratio of N to M, it is desirable that the second, third and fourth intervals "T2", "T3 and "T4 respectively exist one time in a total period corresponding a total interval of a summation of N and M. It may be called to a regular type traffic transmitting method.

In addition, the frequency reuse determining unit 1220 may determine a realtime frequency reuse plan "PLAN depending on magnitude of the carrier to interference and noise ratio "CINR". In more detail, the scheduler 1230 determines the frequency reuse plan "PLAN including first and second traffic transmission in realtime considering the carrier to interference and noise ratio "CINR and the threshold value "THV". The first traffic transmission is a process of assigning the total frequency band to all coverage regions to transmit the traffics. The second traffic transmission is a process of assigning the total frequency band to a single coverage region to transmit the traffics. When the carrier to interference and noise ratio "CINR is greater than the threshold value "THV", the frequency reuse determining unit 1220 determines the frequency reuse plan "PLAN including the first traffic transmission for all coverage regions. In other hand, when the carrier to interference and noise ratio "CINR is less than the threshold value "THV", the frequency reuse determining unit 1220 determines the frequency reuse plan "PLAN" including the second traffic transmission for a single coverage region. Accordingly, a ration between the first traffic transmission and the second traffic transmission is not fixed to N:M, but variable in realtime. It may be called to an irregular type traffic transmitting method. Accordingly to the present invention, sequential second traffic transmissions may follow the first traffic transmission depending on the frequency reuse plan "PLAN".

Moreover, the scheduler 1230 may send a sleep mode message to at least one portable subscriber station (PSS) having a carrier to interference and noise ratio "CINR greater than the threshold value "THV". The portable subscriber station (PSS) receiving the sleep mode message does not receive the traffics during a period of the second traffic transmissions. It may be referred to as a sleep mode. Due to the sleep mode, battery efficiency of the portable subscriber station (PSS) is improved. In this case, since each interval, which corresponds to each of the first and second traffic transmissions, is set for less than 5 msec and a total interval, which includes the first traffic transmission and the second traffic transmissions, is set for less than 20 msec in the radio access station system according to the present invention, user of the portable subscriber station (PSS) does not feel disconnection of communication services with radio access station (RAS) in spite of the sleep mode. For example, at least one of the first, third and fifth portable subscriber stations (PSS) 501, 503 and 505 in FIG. 5 receives the sleep mode message such that the at least one has the sleep mode during the second, third and fourth intervals T2, T3 and T4. Moreover, at least one of portable subscriber stations (PSS) in the first, second and third adjacent regions 1111, 1112 and 1113 in FIG. 11 receives the sleep mode message such that the at least one has the sleep mode during the second, third and fourth intervals T2, T3 and T4. Namely, when portable subscriber stations (PSS) has the carrier to interference and noise ratio "CINR greater than a threshold value "THV by the frequency reuse determining unit 1220, the radio access station (RAS) system 1200 treats the portable subscriber stations (PSS) as being in a region adjacent to the radio access station (RAS). Accordingly, the radio access station (RAS) system 1200 sends the sleep mode message to the portable subscriber stations (PSS) in the region adjacent to the radio access system (RAS) such that they do not communicate with the radio access station (RAS) during the second, third and fourth intervals T2, T3 and T4.

On the other hand, the scheduler 1230 may apply an offset adjustment to the carrier to interference and noise ratio (CINR) from the CINR measuring unit 1210 to optimize a modulation level to be sent the portable subscriber stations (PSS) 1240. When the carrier to interference and noise ratio (CINR) is relatively low, a low level modulation method is used. On the other hand, when the carrier to interference and noise ratio (CINR) is relatively high, a high level modulation method is used. In more detail, when the traffics are transmitted to a single sector or a single cell according to a determined frequency reuse plan "PLAN after being transmitted the traffics to all sectors or all cells, the scheduler 1230 applies a positive offset, which corresponds to the high level modulation method, to transmit traffics with a modulation level higher than the former modulation level. In contrast, when traffics are transmitted to all sectors or all cells according to a determined frequency reuse plan "PLAN after being transmitted the traffics to a single sector or a single cell, the scheduler 1230 applies a negative offset, which corresponds to the low level modulation method, to transmit traffics with a modulation level lower than the former modulation level. A modulation method used for a portable internet system includes about ten types, e.g., a quadrature phase shift keying (QPSK) 1/12 type, 16-quadrature amplitude modulation (16-QAM) type and 64-quadrature amplitude modulation (64-QAM) type.

Figure 13:
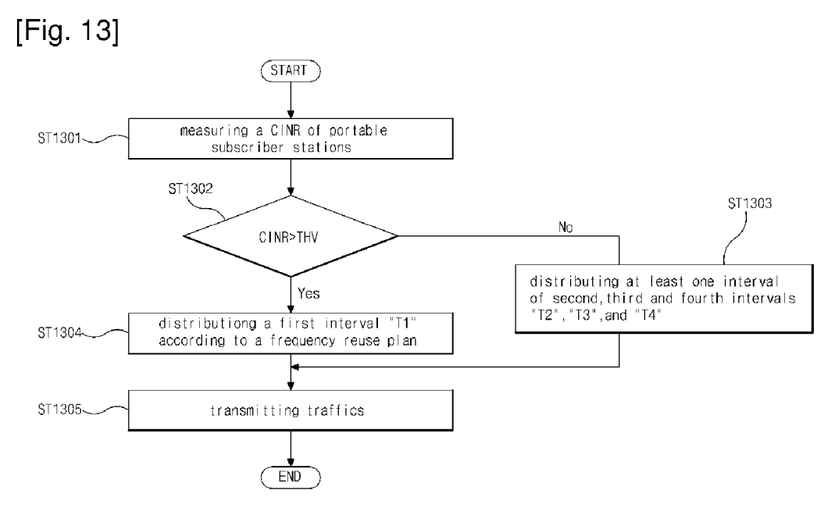
FIG. 13 is a flow chart to explain a driving method of a radio access station (RAS) system in FIG. 12.

FIG. 13 is a flow chart to explain a driving method of a radio access station (RAS) system in FIG. 12. A radio access station (RAS) according to the present invention determines a ratio of a transmission number of the traffics to all coverage regions to a transmission number of the traffics to a single coverage region with a carrier to interference and noise ratio (CINR). As shown in FIG. 13, the radio access station (RAS) system 1200 (of FIG. 12) measures the carrier to interference and noise ratio (CINR) of the portable subscriber stations (PSS) 1240 via the carrier to interference and noise ratio (CINR) measuring unit 1210 (of FIG. 12). (ST 1301) As mentioned above, the carrier to interference and noise ratio (CINR) may be measured by detecting magnitude of signals sent by each portable subscriber station (PSS) 1240 during a period of up-link. On the other hand, the carrier to interference and noise ratio (CINR) measuring unit 1210 may periodically receive data of the carrier to interference and noise ratio (CINR) from each portable subscriber station (PSS) 1240 during a period of down-link.

Next, the radio access station (RAS) system 1200 (of FIG. 12) determines the frequency reuse plan "PLAN (of FIG. 12) by comparing the carrier to interference and noise ratio "CINR (of FIG. 12) with the threshold value "THV (of FIG. 12) through the frequency reuse (FR) determining unit 1220 (of FIG. 12). (ST 1302) One of the regular type traffic transmitting method and the irregular traffic transmitting method is applied. Although not shown in FIG. 13, in the regular type traffic transmitting method, ratio of a transmission number of the traffics to all coverage regions to a transmission number of the traffics to a single coverage region is fixed. On the other hand, in the irregular type traffic transmitting method, the radio access station system 1200 (of FIG. 12) determines which interval is applied depending on a result from the step 1302. The total frequency band is assigned all sectors or all cells, and the carrier to interference and noise ratio CINR (of FIG. 12) of each portable subscriber station (PSS) 1240 (of FIG. 12) is measured. When the carrier to interference and noise ratio "CINR" (of FIG. 12) of one portable subscriber station (PSS) is greater than the threshold value "THV (of FIG. 12), the radio access station (RAS) system 1200 treats the portable subscriber station (PSS) exists in a region where the signal interference is relatively low, and thereby distributing the first interval "T1 (of FIG. 12) according to the frequency reuse plan "PLAN (of FIG. 12). (ST 1304) Accordingly, the radio access station (RAS) system 1200 assigns the total frequency band to all coverage regions so as to transmit the traffics during the first interval "T1 (of FIG. 12). (ST 1305) On the other hand, when the carrier to interference and noise ratio "CINR" (of FIG. 12) of one portable subscriber station (PSS) is less than the threshold value "THV (of FIG. 12), the radio access station (RAS) system 1200 treats the portable subscriber station (PSS) exists in a region where the signal interference is relatively high, and thereby distributing at least one of the second, third and fourth intervals "T2", "T3 and "T4 (of FIG. 12) according to the frequency reuse plan "PLAN (of FIG. 12). (ST 1303) Accordingly, the radio access station (RAS) system 1200 assigns the total frequency band to a single coverage region so as to transmit the traffics during at least one of the second, third and fourth interval "T2", "T3" and "T4" (of FIG. 12). (ST 1305)

Consequently, in the radio access station (RAS) system 1200 according to the present invention, system capacity increases by enlarging an available frequency band, and cell coverage is maximized by avoiding signal interference.

The radio access station (RAS) system according to the present invention includes a computer readable recording media having a program command to play various computer systems. The computer readable recording media may further include singly or combination of a data file and a data structure. The readable medium may be designed for the present invention. The readable media may be public ones. The computer readable recording media may be one of magnetic media such as a hard disc, a floppy disc and a magnetic tape, magnetic optical media such as optical recording media and floptical disc, and a hardware device storing and playing the program command, such as read only memory (ROM), random access memory (RAM), flash memory. The program command may includes not only machine language formed by a compiler but also high-level language by being played using an interpreter.

It will be apparent to those skilled in the art that various modifications and variations can be made in the portable internet radio access station including a plurality of management processors and the method of controlling the plurality of management processors of embodiments of the invention without departing from the spirit or scope of the invention. Thus, it is intended that embodiments of the invention cover the modifications and variations of this invention provided they come within the scope of the appended claims and their equivalents.

INDUSTRIAL APPLICABILITY

In a radio access station (RAS) system according to the present invention, a frequency reuse factor-1 (FRF-1) type scheme is time-divisionally applied depending on magnitude of communicated signal between the radio access station (RAS) and a portable subscriber station (PSS) such that there are only advantages of both a relatively low frequency reuse factor (FRF) type scheme and a relatively high frequency reuse factor (FRF) type scheme except disadvantages of them.

In more detail, a frequency reuse plan is flexibly adopted considering signal interference between adjacent sectors and between adjacent cells such that cell coverage and system capacity are improved.

Moreover, since each interval is set for less than 5 msec and a total interval of the first to fourth intervals is set for less than 20 msec in the radio access station, user of the portable subscriber station (PSS) does not feel disconnection of communication between the portable subscriber station (PSS) and the radio access station (RAS).

Furthermore, since there is a sleep mode, battery efficiency of the portable subscriber station (PSS) is improved.

The invention claimed is:

1. A frequency reusing method in a wireless communication system in which a radio access station (RAS) transmits information to portable subscriber stations (PSSs) in a coverage region of the RAS, the coverage region including first, second, and third regions, the method comprising:
   (a) transmitting the information to at least one PSS in the coverage region by assigning an identical frequency band to all of the first, second, and third regions during a first interval according to a frequency reuse plan;
   (b) transmitting the information to at least one PSS in the first region by assigning the identical frequency band to the first region during a second interval according to the frequency reuse plan;
   (c) transmitting the information to at least one PSS in the second region by assigning the identical frequency band to the second region during a third interval according to the frequency reuse plan; and
   (d) transmitting the information to at least one PSS in the third region by assigning the identical frequency band to the third region during a fourth interval according to the frequency reuse plan,
   wherein the frequency reuse plan is determined by comparing a carrier to interference and noise ratio (CINR) of each of the PSSs in the coverage region and a threshold value,
   wherein the identical frequency band is reused in the first, second, and third regions, and
   wherein the steps (a) to (d) are sequentially performed.

2. The frequency reusing method according to claim 1, wherein the steps (a) to (d) are periodically repeated with a period that is a summation of the first, second, third, and fourth intervals.

3. The frequency reusing method according to claim 1, wherein each of the first to fourth intervals is set for less than 5 msec.

4. The frequency reusing method according to claim 1, wherein the identical frequency band is divided into at least two sub-frequency bands, and at least one sub-frequency band is used for transmitting the information.

5. The frequency reusing method according to claim 1, wherein the information is transmitted by an orthogonal frequency division multiple access (OFDMA) scheme in the step (a), and a data frame for transmitting the information includes control messages at least twice repeated in the step (a).

6. The frequency reusing method according to claim 1, wherein each of data frames for transmitting the information in the steps (b) to (d) includes a single control message without being repeated.

7. The frequency reusing method according to claim 1, wherein the coverage region is a cell covered by a single radio access station (RAS), and the first, second and third regions are sectors of the cell.

8. A frequency reusing method in a wireless communication system in which a radio access station (RAS) transmits information to portable subscriber stations (PSSs) in a plurality of coverage regions, the method comprising:
   (a) transmitting the information to at least one PSS in the plurality of coverage regions by assigning an identical frequency band to all of the plurality of coverage regions during a first interval according to a frequency reuse plan; and
   (b) transmitting the information to at least one PSS in a first coverage region among the plurality of coverage regions at least once by assigning the identical frequency band to the first coverage region during a second interval according to the frequency reuse plan, wherein the frequency reuse plan is determined by comparing a carrier to interference and noise ratio (CINR) of each of the PSSs in the plurality of coverage regions and a threshold value, wherein the identical frequency band is reused in the plurality of coverage regions, and wherein the steps (a) and (b) are sequentially performed.

9. The frequency reusing method according to claim 8, further comprising:
 (c) transmitting the information to at least one PSS in a second coverage region among the plurality of coverage regions at least once by assigning the identical frequency band to the second coverage region during a third interval according to the frequency reuse plan, after the step (b).

10. The frequency reusing method according to claim 9, further comprising:
 (d) transmitting the information to at least one PSS in a third coverage region among the plurality of coverage regions at least once by assigning the identical frequency band to the third coverage region during a fourth interval according to the frequency reuse plan, after the step (c).

11. The frequency reusing method according to claim 8, wherein the steps (a) to (b) are periodically repeated with a period that is a summation of the first and second intervals.

12. The frequency reusing method according to claim 9, wherein the steps (a) to (c) are periodically repeated with a period that is a summation of the first, second, and third intervals.

13. The frequency reusing method according to claim 10, wherein the steps (a) to (d) are periodically repeated with a period that is a summation of the first, second, third, and fourth intervals.

14. The frequency reusing method according to claim 8, wherein the assigning of the identical frequency is performed depending on a position of a portable subscriber station having a carrier to interference and noise ratio (CINR) less than the threshold value.

15. The frequency reusing method according to claim 8, further comprising:
 (c) transmitting a sleep mode message to at least one PSS receiving the information during the first interval such that the at least one portable subscriber station is driven by a sleep mode during the second interval.

16. The frequency reusing method according to claim 8, wherein the step (a) includes transmitting a data frame having at least twice repeated control messages.

17. The frequency reusing method according to claim 8, wherein the information is transmitted with a data frame having a single control message.

18. The frequency reusing method according to claim 8, wherein the plurality of coverage regions correspond to cell regions of adjacent radio access stations or sectors of a single radio access station.

19. A radio access station (RAS) system for a frequency reuse, comprising:
 a carrier to interference and noise ratio (CINR) measuring unit configured to measure a carrier to interference and noise ratio (CINR) of a plurality of portable subscriber stations;
 a frequency reuse (FR) determining unit configured to determine a frequency reuse plan by comparing the carrier to interference and noise ratio (CINR) and a threshold value; and
 a scheduler configured to perform a first information transmission for transmitting information by assigning an identical frequency band to a plurality of coverage regions during a first interval and then perform a second information transmission for transmitting the information by assigning the identical frequency band to at least one of the plurality of coverage regions during a second interval according to the frequency reuse plan,
 wherein the identical frequency band is reused in the plurality of coverage regions.

20. The radio access station (RAS) system according to claim 19, wherein a first data frame, having at least two repeated control messages, is transmitted in the first information transmission, and a second data frame, having a single control message, is transmitted in the second information transmission.

21. The radio access station (RAS) system according to claim 19, wherein the plurality of coverage regions correspond to cell regions of adjacent radio access stations or sectors of a single radio access station.

22. The radio access station (RAS) system according to claim 19, wherein a ratio of a number of the first information transmission to a number of the second information transmission is fixed or variable.

23. The radio access station (RAS) system according to claim 19, wherein the scheduler is configured to perform the first information transmission N times, and the second information transmission M times, and wherein each of the N and M is a positive integer, and the ratio of N to M is determined according to a magnitude of the carrier to interference and noise ratio (CINR).

24. The radio access station (RAS) system according to claim 23, wherein the scheduler is configured to sequentially assign the identical frequency band to each of the plurality of coverage regions in the second information transmission.

25. The radio access station (RAS) system according to claim 19, wherein a ratio of a number of the first information transmission to a number of the second information transmission is determined in real-time depending on a magnitude of the carrier to interference and noise ratio (CINR).

26. The radio access station (RAS) system according to claim 19, wherein the scheduler is configured to transmit a sleep mode message to at least one portable subscriber station having the carrier to interference and noise ratio (CINR) greater than the threshold value during the first interval such that the at least one portable subscriber station is driven by a sleep mode during a period of the second information transmission.

27. The radio access station (RAS) system according to claim 20, wherein the radio access station (RAS) system is used for a communication system according to at least one of IEEE 802.16d/e, WiBro, and WiMAX standards.

28. The frequency reusing method according to claim 1, wherein the CINR of said at least one PSS is greater than the threshold value.

* * * * *